April 15, 1969 H. D. COOK 3,439,332

SPIRAL-VERTICAL PARITY GENERATING SYSTEM

Filed July 6, 1965 Sheet 1 of 2

INVENTOR
HAROLD D. COOK

BY R. C. Terry
ATTORNEY

United States Patent Office 3,439,332

Patented Apr. 15, 1969

3,439,332

SPIRAL-VERTICAL PARITY GENERATING SYSTEM

Harold D. Cook, Wheaton, Ill., assignor to Teletype Corporation, Skokie, Ill., a corporation of Delaware Filed July 6, 1965, Ser. No. 469,522

Int. Cl. G06f *11/10;* G08b *29/00*

U.S. Cl. 340—146.1 8 Claims

ABSTRACT OF THE DISCLOSURE

A parity check bit generator wherein the characters to be checked are supplied simultaneously in parallel to a plurality of modulo 2 adders and to a vertical parity bit generator. The output of the vertical parity generator is supplied as the other input to the adders, causing the output thereof to represent the modulo 2 sum of the information bit for each level of the character and the vertical parity count taken over the same character. The outputs of the adders are supplied as the input signals to a spiral parity check bit shift register, the output of which is a combination spiral-vertical parity check bit.

In the transmission of telegraph signals where words or data are being transmitted over a line, an error in the signal generally is evidenced by garbling of the message or by some error in a word or portion of data in the message.

In the transmission of messages involving only words, the detection of errors usually is a simple matter since a printed word in a sentence contains considerable redundancy. If the message, however, consists merely of a series of numerals, such as occurs in the transmission of data, an error is not easily detectable by reading the copy received at the receiving station since such a message contains little or no redundancy. For this reason, various types of error detection systems have been devised in the past for indicating errors in telegraph messages.

Some prior art error detecting systems utilize weighted codes, that is, codes in which a fixed ratio of marking to spacing information bits is maintained in the transmission of each character. Such systems necessarily contain a high degree of redundancy and are wasteful of line time. In addition, these systems also are undesirable since they are not compatible with the standard 5-unit Baudot code or the standard 8-unit ASCII code. Thus, it is necessary to convert these standard codes into a weighted code at the transmitter and to reconvert the weighted code into the standard codes at the receiver in order to utilize the information transmitted in such a system. This results in extra expensive converting equipment in addition to the expense of the extra line time required because of the high redundancy of the code itself.

Vertical parity check systems exist in which a single parity check bit is transmitted for each character in order to make the total number of marking or spacing information bits in the character odd or even as desired. In such a system if even marking parity is desired, a marking parity check bit is added if the marking information bits of the character are odd in number, and a spacing parity check bit is added if the marking information bits of the character are even. Such a vertical parity check system allows character-by-character detection of an odd number of errors in each character but is susceptible of failure in the event that an even number of errors occurs in the transmission of any given character. Since transmission errors tend to occur in groups rather than as single isolated errors, such a vertical parity check system may very likely fail to recognize a considerable number of errors.

In order to overcome the disadvantages inherently present in vertical parity check systems, horizontal and spiral parity check systems have been devised. In the horizontal parity check system all of the information bits of one type (either marking or spacing) in each level of a multi-element signal are counted and a check character is formed therefrom at the end of a predetermined number of characters or at the end of the entire message. Horizontal parity check systems, however, have the disadvantage of being rendered ineffective if, for example, the tape sensing pins at the transmitter are defective in one level. Since the parity check counter is of an odd-even type as it is with a vertical check counter, an even number of errors in any particular level will not be detected by a horizontal parity check system.

Spiral parity check systems also have been utilized in the past. These systems for detecting errors count on an odd-even basis, the information bits of one type in the first level of a first character, the second level of the second character, the third level of the third character and so forth, with all of the levels of the character being counted simultaneously in this manner along different spiral paths; so that the probability of detecting an error that may have been caused by a faulty sensing pin on any given level is increased without increasing the redundancy required for a horizontal parity check system. However, certain groupings of errors will cause a spiral parity check system to fail to detect an error when in fact such errors do exist, for example, if an error occurs in the first level of the first character and in the third level of the third character along a spiral path.

It should be noted, however, that in the first and third characters only a single error occurred so that a vertical parity check on those characters would have detected both errors. Likewise, in the case of an even number of errors occurring in a given character causing failure of a vertical parity check on that character, each of these errors would be detected along a different spiral path in a spiral parity check generating system.

Accordingly, it is an object of this invention to provide a new and improved error detecting apparatus.

It is an additional object of this invention to detect errors in a multi-element telegraph signal by means of a combination spiral-vertical parity check method.

It is a further object of this invention to generate a parity check bit for each character transmitted in a multi-element telegraph signal wherein the parity check bit is derived from the modulo 2 sum of each information bit of the element and a first parity count taken over one parity check path, with the sum being included in another parity check path.

It is another object of this invention to include each information bit of a telegraph signal in two separate parity check paths while providing a single parity check bit for each character of the telegraph message.

It is a more specific object of this invention to generate a parity check bit for each character transmitted in a multi-element telegraph signal by adding a vertical parity check count taken over each character to each information bit of the character and subsequently causing a spiral parity check to be made of the resultant odd-even sums.

These and other objects of this invention are accomplished in a preferred embodiment of the invention in which the characters to be checked are supplied simultaneously in parallel to a plurality of modulo 2 adders or Exclusive OR gates and to a vertical parity check bit generator. The output of the vertical parity check generating circuit is supplied as the other input to the Exclusive OR gates, thereby causing the output of the Exclusive OR gates to represent the modulo 2 sum of the information bit for each level and the vertical parity count taken over the same character. A spiral parity check generating circuit is provided, and the outputs of the Exclusive OR gates are supplied as the input signals to the spiral parity check generating circuit.

The output of the spiral parity check generating circuit is a combination spiral-vertical parity check bit and may be transmitted as a parity check bit at the end of each character. The result is a parity check which will not fail even though double errors occur along either the vertical or spiral parity check paths alone. The error detection power of such a combination spiral-vertical parity check bit is considerably greater than that obtained by either the spiral or vertical parity check system alone.

Other objects and features of this invention will become apparent to those skilled in the art upon consideration of the following detailed specification taken in conjunction with the drawings in which.

Figure 1:
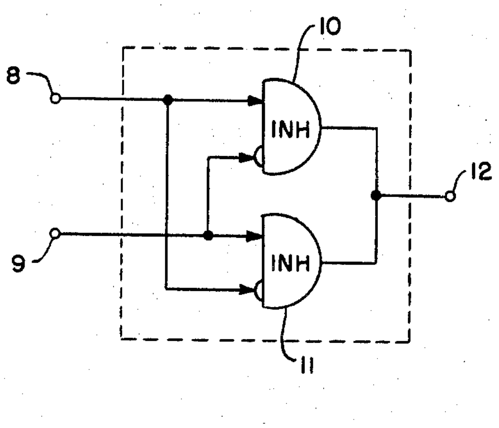
FIG. 1 is a schematic diagram of a form of an Exclusive OR gate of the type which may be used in FIG. 3.
Figure 2:
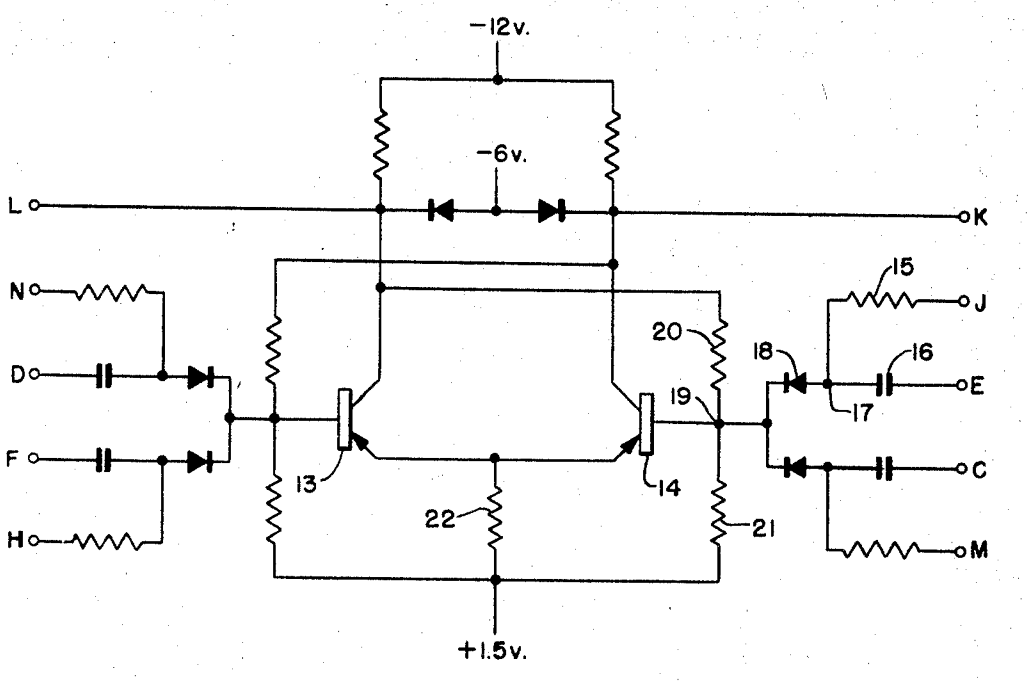
FIG. 2 is a detailed schematic diagram of the circuit utilized in each stage of the shift register shown in the circuit of FIG. 3.
Figure 3:
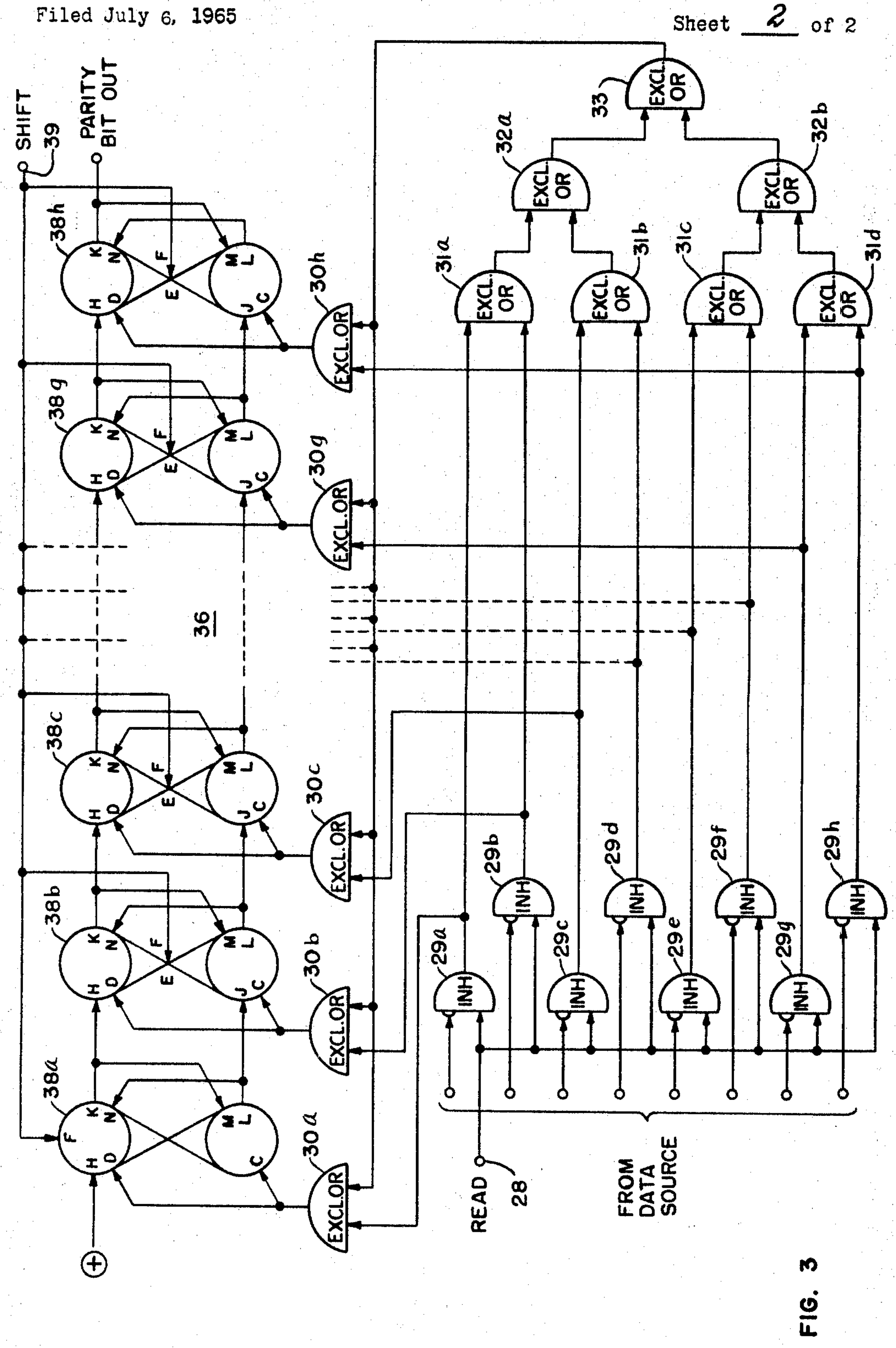
FIG. 3 is a schematic diagram of a preferred embodiment of the invention.

Before discussing the circuit diagram of the preferred embodiment of the invention shown in FIG. 3, reference should be made to FIGS. 1 and 2 which show details of the circuit components used in the system shown in FIG. 3. FIG. 1 shows a preferred embodiment of the Exclusive OR gate or modulo 2 adder utilized in FIG. 3. Such an Exclusive OR gate adder preferably is comprised of a pair of inhibit gates 10 and 11 interconnected so that an input signal to the inhibit gate 10 applied to terminal 8 also is applied in parallel as the inhibit input to the inhibit gate 11. Similarly, the input signal to the inhibit gate 11 applied to terminal 9 is applied in parallel to the inhibit input of the gate 10.

Whenever a negative potential is applied to the input terminals 8 and 9 of both of the inhibit gates 10 and 11, a negative potential is obtained at the output terminal 12 since this is the steady state or normal output from each of these gates in the absence of a positive input signal. Likewise, when a positive input signal is applied to both terminals 8 and 9, a negative output is obtained at the terminal 12 since the positive signal applied to the gate 10 inhibits the gate 11 and the positive signal applied to the gate 11 inhibits the gate 10 thereby preventing the passage of a positive signal by either of the gates. When a positive input signal is applied to either one of the gates 10 or 11 with a negative input signal being applied to the other gate, a positive signal is obtained at the output terminal 12. This positive signal is passed by the gate to which it is applied since at that time a negative signal is being applied to the inhibit input of that same gate. Thus, it is apparent that the interconnected inhibit gates 10 and 11 function as a modulo 2 adder since whenever both of the binary input signals are the same, the output of the adder is a negative potential and whenever the inputs to the gates 10 and 11 are different, the output of the adder is positive.

The terms "positive" and "negative" potentials as used in this description merely refer to relative potentials and do not necessarily mean that one of these potentials is above ground and the other below ground. For example, the positive potential could be 0 volt with the negative potential being −6 volts, or the positive potential could be +6 volts with the negative potential being 0 volt.

Referring now to FIG. 2 there is shown a detailed circuit diagram of the bistable multivibrator of the type utilized in each stage of the shift register shown in FIG. 3. This bistable multivibrator includes four input gates, each of which has a priming or conditioning input and an associated triggering input. These inputs are such that the gates are capable of accepting a priming input and successfully triggering the associated transistor of the bistable multivibrator even though the triggering pulse arrives simultaneously with the removal of the priming input. The bistable multivibrator consists of a pair of transistors 13 and 14 with two gates connected to the input of the transistor 13 and two gates connected to the input of the transistor 14.

In an illustration of the operation of the type of gate used to trigger the bistable multivibrator shown in FIG. 2 assume that a binary 1 is represented by 0 volt DC and that a binary 0 is represented by −6 volts DC. If a binary 1 (0 volt) is applied to the priming input terminal J and a binary 0 (−6 volts) is applied to the trigger input terminal E, the RC circuit comprised of a resistor 15 and a capacitor 16 assumes a steady state with 0 volt appearing at a junction 17 and −6 volts appearing at the input terminal E. Thus, the voltage across the capacitor 16 is 6 volts.

Now assume that the transistor 14 is conductive. To trigger the transistor 14 to non-conduction, the voltage at the input terminal E must experience a step-change from −6 volts to 0 volt (a binary 0-to-1 transition). Since the voltage across the capacitor 16 cannot change instantaneously and since 0 volt appears at input terminal E, +6 volts must appear at the junction point 17. This positive potential at junction 17 then causes a positive trigger pulse to flow through a diode 18 into the base of the transistor 14. If the transistor 14 is conducting at this time, the positive trigger pulse overcomes the bias of the transistor 14 turning it off. The circuit comprised of the transistors 13 and 14 with their associated collector and base bias resistors is a standard Eccles-Jordan bistable multivibrator well known in the prior art. Thus, when the transistor 14 is turned off, the transistor 13 is rendered conductive and vice-versa.

If a binary 0 (−6 volts) appears at the priming input terminal J and also at the triggering input terminal E, there is no voltage difference across the capacitor 16, and the junction 17 assumes a −6 volt potential. The potential at the junction point 19 then is approximately +.5 volt derived by the resistors 20, 21 and 22 and the conducting transistor 14. The diode 18 therefore is reverse biased 6.5 volts. A change from −6 volts to 0 volt at the triggering input terminal E then results in 0 volt appearing at the junction 17. This voltage, however, is not enough to forward bias the diode 18 and therefore no trigger pulse is available to render the transistor 14 nonconductive.

The operation of the other three gates shown in FIG. 2 is identical to the operation of the gate including the input terminals J and E and described in detail above. The priming input M and trigger input C also are connected to the input of the transistor 14 and correspond in function to the priming input J and trigger input E. In a similar manner, priming input N and trigger input D, and priming input H and trigger input F are connected to the base of the transistor 13 and operate upon that transistor in the same manner as described for the operation of input signals applied to the inputs J and E for rendering the transistor 14 nonconductive. Two output terminals L and K are shown in FIG. 3 with the output terminal L being at a positive potential when the transistor 13 is conductive and with the output terminal K being at a positive potential when the transistor 14 is conductive. It should be noted that whenever either of the output terminals L or K is at a positive potential the other of them is at a negative potential.

Referring now to FIG. 3 there is shown a spiral-vertical parity check bit generating system in accordance with a preferred embodiment of the invention. The input to the system is obtained from a suitable data source, such as a tape reader at the transmitter or a receiving distributor at the receiver. For purposes of illustration, assume that the input signal is in the form of telegraph characters consisting of eight levels of marking and spacing information bits or elements encoded in permutation code. Also assume that a mark detected in this permutation code is represented by a positive potential or a first control condition and that a space is represented by a negative potential or a second control condition on the appropriate input lead from the data source.

The parity check bit generating system shown in FIG. 3 is designed to maintain an even spacing parity condition; so that if an odd number of spaces are detected in the spiral-vertical parity count, a negative potential or spacing output would be obtained from the system. On the other hand, if an even number of spaces are detected by the spiral-vertical parity count, a positive potential or marking output will be obtained from the system.

The input signals from the data source are applied in parallel to the inhibit terminals of a plurality of inhibit gates 29_a_ through 29_h_, one gate 29 being provided for each level of the signal. When it is desired to read the signal at the data source into the parity check generating circuit, a read pulse is applied to a read terminal 28. The read pulse will be passed by any gate 29 which is not detecting a mark (that is any gate 29 associated with a level of the signal containing a space), and the read pulse will be blocked by any gate 29 associated with a level containing a mark since a mark is represented by a positive potential applied to the inhibit input of such a gate. Thus, any of the gates 29 associated with a level detecting a space passes a positive signal. These signals are applied as one input to a plurality of Exclusive OR gates 30_a_ through 30_h_. Simultaneously, these signals are applied in parallel and in pairs to a plurality of Exclusive OR gates or modulo 2 adders 31_a_ through 31_d_. As shown in FIG. 3 the inputs to each adder 31 are obtained from two different levels of the signal from the data source.

Each adder 31 is of the type shown in FIG. 1. Thus, whenever both inputs to one of the adders 31 are positive or both inputs are negative, signifying an even number of spaces in the two levels supplying the input signals to the adder, the output of that adder is negative. Likewise, whenever one of the two inputs to an adder 31 is positive and the other input is negative, signifying an odd number of spaces in the two levels supplying the input signals to the adder, the output from the adder 31 is positive.

The outputs of the adders 31_a_ and 31_b_ comprise the input signals to a similar modulo 2 adder 32_a_, and the outputs of the adders 31_c_ and 31_d_ comprise the inputs to a similar modulo 2 adder 32_b_. In a similar manner the outputs of the adders 32_a_ and 32_b_ comprise the inputs to a modulo 2 adder 33. The adders 31_a_ through 31_d_, 32_a_ and 32_b_ and 33 are connected in a tree circuit and function so that whenever an odd number of spaces takes place among the eight inputs to the tree circuit, a positive signal is obtained from the final modulo 2 adder 33. Similarly, whenever an even number of spaces exists on the eight input leads supplied to the adders 31_a_ through 31_d_, a negative potential is obtained from the output of the adder 33.

The output of the adder 33 is supplied as the other input to each of the Exclusive OR gates 30_a_ through 30_h_. This causes the vertical parity count taken over a character by the modulo 2 adder tree consisting of the gates 31_a_ through 31_d_, 32_a_, 32_b_ and 33 to be added sum modulo 2 to each information bit or element of the character. The result of this addition then is applied to a corresponding stage of a spiral parity check generating circuit comprising a special type of shift register 36. The Exclusive OR gates 30 cause a positive output pulse to be applied to their corresponding stages of the shift register 36 whenever either an odd number of spaces exist in the character and the particular level with which the Exclusive OR gate 30 is associated contains a mark, or whenever the vertical parity count of the spaces in the character is even and the particular level of the character with which gate 30 is associated contains a space. Other combinations cause a negative output signal to be obtained from the Exclusive OR gate 30.

Each of the stages of the shift register 36 is comprised of a bistable multivibrator 38 with a plurality of such bistable multivibrators 38_a_ through 38_h_ being provided and being equal in number to the number of Exclusive OR gates 30_a_ through 30_h_. In order to avoid unnecessary clutter of the drawing only five of the eight stages of the shift register 36 have been shown in FIG. 3 with the remaining three stages being indicated by dotted lines. This has been done since all of these stages are identical and all of them function in the same manner. The positive pulses passed by the Exclusive OR gates 30 are applied to the C and D trigger inputs of the corresponding bistable multivibrators 38_a_ through 38_h_.

The bistable multivibrators 38_a_ through 38_h_ are identical to those shown in FIG. 2 and described previously. The inputs and outputs of these multivibrators are identified by the same designations utilized in FIG. 2 so that further detailed description of the operation of these multivibrators will not be given here. Whenever the shift register 36 contains a binary 0 in a stage, the output terminal K of that stage is at a positive potential and the output terminal L is at a negative potential. Likewise, whenever the shift register 36 contains a binary "1" in a stage, the output terminal K of that stage is at a negative potential and the output terminal L is at a positive potential. It will be seen that a positive potential from the output terminal K provides a priming input signal to the input terminal M of the same bistable multivibrator from which the output is obtained, and also provides a priming input signal to the priming input H of the next succeeding bistable multivibrator 38. A positive potential from the output terminal L provides a priming signal to the input terminal N of the same multivibrator from which the output is obtained, and also provides a priming input signal to the priming input J of the next succeeding multivibrator 38.

Thus, when a positive output pulse is obtained from an Exclusive OR gate 31_a_ through 30_h_ associated with a level of the data source containing a mark and this pulse is applied to the input C of a multivibrator 38, the input M of which has a positive priming signal applied to it, the bistable multivibrator 38 changes its state from a binary "0" to a binary "1." The output K of such a bistable multivibrator 38 then is negative and the output L is positive. Similarly, when a positive pulse is obtained from an Exclusive OR gate 30 and is applied to the input D of a multivibrator 38, the input N of which has a positive priming signal applied to it, the multivibrator changes state from a binary "1" to a binary "0."

It should be noted that whenever a negative signal is applied to a priming input of one of the multivibrators 38_a_ through 38_h_, the application of a positive pulse to its associated trigger input has no affect on the operation of the multivibrator, as has been described previously in conjunction with the description of FIG. 2.

Following the addition of the character to the spiral-vertical shift register as described above, a shift pulse is applied to the terminal 39 and is supplied to the triggering inputs E and F of the stages 38_b_ through 38_h_ of the shift register and to the triggering input F of the stage 38_a_. Since the priming input H of the stage 38_a_ is permanently primed, stage 38_a_ is always reset to store a binary "0" by the shift pulse. The remainder of the stages 38_b_ through 38_h_ are triggered to store the information previously stored in the next preceding stage since they are primed by the K and L outputs of the preceding stage. Thus, if the preceding stage stores a binary "0," a positive priming potential is obtained from the output K of that stage and is applied to the priming input H of the next succeeding stage. When the shift pulse is applied to the trigger input F of that succeeding stage, it stores the binary "0" previously stored in the preceding stage. In a like manner, whenever a stage of the shift register stores a binary "1," the output L of that stage is positive and causes a priming potential to be applied to the priming input J of the next succeeding stage. Thus, when the shift pulse is applied to the input E of that next succeeding stage, it is passed and causes that stage to store a binary "1."

Following the application of this shift pulse which causes the spiral count to be made in the shift register 36, the next character from the data source is supplied to the inhibit inputs of the inhibit gates 29*a* through 29*h* and the next read pulse is then applied to the terminal 28. This causes the next character to be supplied to the system. The modulo 2 sums of the elements of the character and the vertical parity count taken over the character are applied to the shift register 36 in parallel and are added to the information already stored in the shift register 36. The next shift pulse then is applied to the terminal 39, and the foregoing cycle of operation is repeated for each subsequent character.

The output of the terminal K of the final stage 38*h* of the shift register then represents the desired spiral-vertical parity check bit. This parity check bit may be utilized by sampling the output of the terminal K of the stage 38*h* following the application of a read pulse to the terminal 28 and prior to the application of the next shift pulse to the terminal 39. This results in a sequence of operation in which the character is read into the shift register 36, the output of the register is sampled to provide the desired parity check bit, and then a shift pulse is supplied to the shift to register to prepare it for the next cycle of operation.

The bistable multivibrators 38*a* through 38*h* initially are set to store a binary "0." Thus, if the output K of the stage 38*h* is positive, a marking parity check bit is added to the character being supplied from the data source at that time. Conversely, if the output K of the multivibrator 38*h* is negative, a spacing parity check bit is added to the character being supplied from the data source at that time. Because the vertical parity check bit for each character is added to the information bits of the character to form a composit signal which is supplied to the spiral parity check register 36, the system operates to detect errors which would not be detected by either a vertical or a spiral parity check generating system acting alone. Double errors along either the vertical or spiral path will be detected by this system without necessitating the use of any additional line time since a single parity check bit is generated for each character as would be the case whenever a vertical parity check or a spiral parity check generating circuit were used alone.

Prior to the receipt of a new message it is desirable to reset the shift register 36 to store a binary "0" in all stages. This can be done by any suitable conventional means.

The spiral-vertical parity check generating circuits used at the transmitter and at the receiver of a telegraph system are identical. At the transmitter, however, the signals are supplied from a data source such as a tape reader, whereas at the receiver the signal input to the parity check generating circuit is obtained from a receiving distributor. At the transmitter the parity check bit which is generated by the circuit is transmitted as an extra parity check bit at the end of each character, while at the receiver the generated check bit is compared with the received parity check bit in order to ascertain the presence or absence of an error within the spiral-vertical parity check paths over which the parity check was made.

It should be noted that the vertical parity check bit need not be added to the character upon which the vertical check was made, but it can be delayed any desired number of characters. Also, it is not necessary to transmit a check bit at the end of each character, since the system will also work for a continuous parity generation. This may be done by connecting the register 36 in a closed ring and transmitting the contents of the register 36 as a parity check character at the end of a message or at the end of a predetermined number of characters commonly designated a "block" of characters.

It will be apparent to those skilled in the art that although the description of the preferred embodiment of this invention utilized input signals comprising eight information bits per character, the number of information bits in each character is not critical. This number may be varied to fit any code which is being transmitted. In order to generate a spiral-vertical parity bit for a code having a different number of information bits, it merely is necessary to cause the number of stages in the shift register 36 to be equal in number to the number of information bits in the character and to make obvious modifications to the modulo 2 adder tree which is utilized to detect the vertical parity check bit by adding or subtracting modulo 2 adders from the tree.

Various other modifications and changes to the spiral-vertical parity check generator described above in conjunction with a preferred embodiment of the invention will occur to those skilled in the art without departing from the true spirit and scope of this invention.

What is claimed is:

1. Apparatus for detecting errors in the elements of a permutation-coded signal train including:
- means for representing each element of a signal by either of two control conditions;
- means for performing an odd-even count of the elements represented by one of said two control conditions in a signal, the output of said counting means being represented by either of two control conditions; and
- means for adding the output of the counting means sum modulo 2 to the control conditions representing each element of a signal to obtain resultant control conditions corresponding to each element of the signal.

2. In apparatus for detecting errors in the elements of a signal train wherein each signal is composed of a variable number of elements of each of two types permutatively arranged in a predetermined number of levels,
- a plurality of bistable circuits equal in number to the number of levels in a signal;
- means for representing each element of one type by a first condition and for representing each element of the other type by a second condition;
- means for performing an odd-even count of the elements of said one type in a signal, the output of said counting means being represented by either of two conditions;
- means for combining sum modulo 2 the output of the counting means with the conditions representing each element of a signal to obtain a plurality of resultant control conditions, each corresponding to a different element of the signal; and
- means for impressing upon each of the bistable circuits a different one of the resultant control conditions.

3. Apparatus for detecting errors in the permutation-coded elements of a signal train including:
- a plurality of bistable devices equal in number to the number of elements in a signal;
- means for representing each element by either of two control conditions;
- means for performing an odd-even count over a signal of the elements represented by one of said two control conditions, the output of said counting means being represented by either of two control conditions;
- means for adding the output of the counting means sum modulo 2 to the control conditions representing each element of a signal to obtain resultant control conditions corresponding to each element of the signal;
- means for impressing upon each of the bistable devices the resultant control condition corresponding to a different element of the signal; and
- means for transferring the information stored in each bistable device to a different bistable device prior to the receipt of the next signal in the signal train.

4. In apparatus for detecting errors in the elements of a signal train composed of characters each having a number of elements of each of two types arranged in permutation code in a predetermined number of levels, a plurality of bistable circuits equal in number to the number of levels in a character and arranged sequentially;

means for representing each element of one type by a first condition and for representing each element of the other type by a second condition;

means for performing an odd-even count of the elements of said one type in a character, the output of said counting means being represented by either of said first or second conditions in accordance with the odd or even count contained therein;

means for combining the output of the counting means with the conditions representing each element of the same character upon which the count was made to obtain a plurality of resultant control conditions each corresponding to a different element of the character;

means for impressing upon each of the bistable circuits the resultant control condition corresponding to a different element of the character; and means for shifting the information stored in each bistable circuit to the next succeeding bistable circuit prior to the receipt of the next character in the signal train.

5. In apparatus for detecting errors in the elements of a signal train composed of characters each having a variable number of elements of each of two types arranged in permutation code in a predetermined number of levels, a plurality of bistable devices equal in number to the number of levels in a character and arranged sequentially;

means for representing each element of one type by a first condition and for representing each element of the other type by a second condition;

means for performing an odd-even count of the elements of said one type in a character, the output of said counting means being represented by either of said first or second conditions in accordance with the odd or even count contained therein;

a plurality of modulo 2 adders equal in number to the number of levels in a character;

means for supplying the conditions representing each element of a character as first inputs to corresponding ones of the modulo 2 adders;

means for supplying the output of the counting means as a second input to all of the modulo 2 adders to cause a resultant control condition to be obtained from the output of each of the modulo 2 adders;

means for impressing upon each of the bistable devices the resultant control condition obtained from a different modulo 2 adder; and means for shifting the information stored in each bistable device to the next succeeding bistable device prior to the receipt of the next character in the signal train.

6. In apparatus for detecting errors in the elements of a signal train composed of character each having a variable number of elements of each of two types arranged in permutation code in a predetermined number of levels, a plurality of bistable devices equal in number to the number of levels in a character and arranged sequentially;

means for representing each element of one type by a first condition and for representing each element of the other type by a second condition;

means for performing an odd-even count of the elements of said one type in a character, the output of said counting means being represented by either of said first or second conditions in accordance with the odd or even count contained therein;

a plurality of Exclusive OR gates equal in number to the number of levels in a character;

means for supplying the conditions representing each element of a character as first inputs to corresponding ones of the Exclusive OR gates;

means for supplying the output of the counting means as a second input to all of the Exclusive OR gates to cause either of two resultant control conditions to be obtained from the output of each of the Exclusive OR gates, one of which control conditions is capable of actuating the bistable devices from either stable condition to the other;

means for impressing upon each of the bistable devices the resultant control condition obtained from a different Exclusive OR gate; and means for shifting the information stored in each bistable device to the next succeeding bistable device prior to the receipt of the next character in the signal train.

7. In apparatus for detecting errors in the elements of a signal train composed of characters each having a variable number of elements of each of two types arranged in permutation code in a predetermined number of levels, a plurality of bistable devices equal in number to the number of levels in a character and arranged sequentially as a shift register;

means for representing each element of one type by a first condition and for representing each element of the other type by a second condition;

means for performing an odd-even count of the elements of said one type in a character, the output of said counting means being represented by either of said first or second conditions in accordance with the odd or even count contained therein;

a plurality of modulo 2 adders equal in number to the number of levels in a character, each of said adders corresponding to a particular level of the character;

means for supplying the condition representing each element of a character as a first input to the modulo 2 adder corresponding to the level represented by that element;

means for supplying the output of the counting means as a second input to all of the modulo 2 adders to cause either of two resultant control conditions to be obtained from the output of each of the modulo 2 adders, one of which control conditions is capable of actuating the bistable devices from either stable state to the other;

means for impressing upon each of the bistable devices the resultant control condition obtained from a different modulo 2 adder; and means for shifting the information stored in each bistable device to the next succeeding bistable device prior to the receipt of the next character in the signal train.

8. In apparatus for detecting errors in the elements of a signal train composed of characters each having a variable number of elements of each of two types arranged in permutation code in a predetermined number of levels, a plurality of bistable devices equal in number to the number of levels in a character and arranged sequentially as a shift register;

means for representing each element of one type by a first condition and for representing each element of the other type by a second condition;

means for performing an odd-even count of the elements of said one type in a character, the output of said counting means being represented by either of said first or second conditions in accordance with the odd or even count contained therein;

a plurality of Exclusive OR gates equal in number to the number of levels in a character, each of said gates corresponding to a particular level of the character;

means for supplying the condition representing each element of a character as a first input to the Exclusive OR gate corresponding to the level represented by that element;

means for supplying the output of the counting means as a second input to all of the Exclusive OR gates to cause either of two resultant control conditions to be obtained from the output of each of the Exclusive OR gates, one of which control conditions is capable of actuating the bistable devices from either stable state to the other;

means for impressing upon each of the bistable devices the resultant control condition obtained from a different Exclusive OR gate; and means for shifting the information stored in each bistable device to the next succeeding bistable device prior to the receipt of the next character in the signal train.

References Cited

UNITED STATES PATENTS

| | | | |
|---|---|---|---|
| 2,956,124 | 10/1960 | Hagelbarger | 340—146.1 X |
| 2,977,047 | 3/1961 | Bloch | 235—153 |
| 3,024,444 | 3/1962 | Barry et al. | 340—146.1 X |

OTHER REFERENCES

Freiman, C. V.: Longitudinal Checks Using Transverse Parity, IBM Technical Disclosure Bulletin, vol. 6, No. 2, July 1963.

MALCOLM A. MORRISON, *Primary Examiner.*

C. E. ATKINSON, *Assistant Examiner.*

U.S. Cl. X.R.

178—23; 235—153